June 23, 1931.  L. M. OAKLEY  1,811,803
RUBBER SOLE AND HEEL FOR BOOTS AND SHOES
Filed Nov. 1, 1927
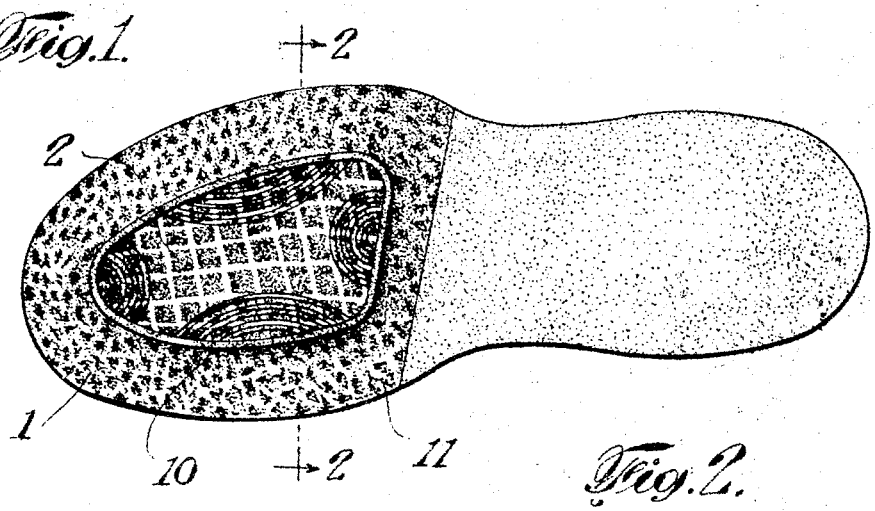
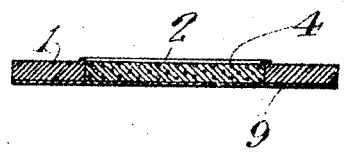
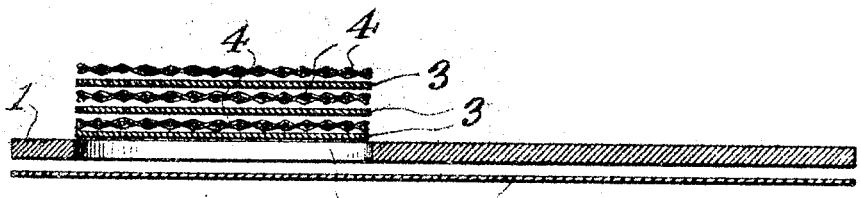
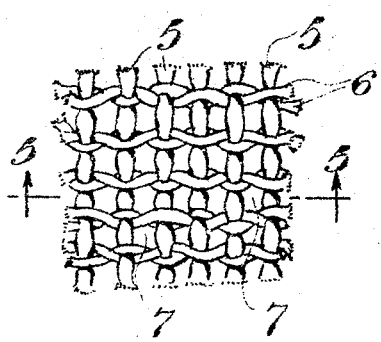
Inventor
Lawrence M. Oakley
By his Attorneys
Emery, Booth, Janney & Varney Patented June 23, 1931

1,811,803

UNITED STATES PATENT OFFICE

LAURENCE M. OAKLEY, OF TRENTON, NEW JERSEY, ASSIGNOR TO ESSEX RUBBER COMPANY, OF TRENTON, NEW JERSEY, A CORPORATION OF NEW JERSEY

RUBBER SOLE AND HEEL FOR BOOTS AND SHOES

Application filed November 1, 1927. Serial No. 230,210.

This invention relates to rubber soles and heels for boots and shoes. It is an object of the invention to incorporate textile fabric in the soles and heels in such manner that both rubber and fabric may be exposed to form a tread surface which will possess, in addition to its other characteristics, anti-slip properties. It is a further object of the invention to so incorporate the textile fabric as to reinforce the same to thereby improve its wear resistant qualities.

Other objects and advantages will appear hereinafter.

A preferred embodiment of the invention selected for purposes of illustration is shown in the accompanying drawings, in which, Figure 1 is a top plan view of a sole embodying the invention.

Figure 2 is a section on the line 2—2 of Figure 1.

Figure 3 is an exploded sectional view illustrating the parts prior to assembly.

Figure 4 is a fragmentary detail view of the textile fabric, and

Figure 5 is a section on the line 5—5 of Figure 4.

For purposes of simplifying the description the invention will be described herein only as applied to a sole, for it will be apparent to those skilled in the art that the same principles may be applied in the making of a heel.

Referring to the drawings, the sole illustrated comprises, in general, the body portion 1 and a central tread portion 2. The body portion may comprise a sheet of rubber calendered to the desired thickness and died out to the desired shape. The central tread portion, on the other hand, comprises plies of sheet rubber and textile fabric 3 and 4 respectively arranged to lie in planes parallel to the plane of the tread surface of the sole. Preferably the plies of rubber are relatively thin and are arranged alternately with the plies of textile fabric, several layers being preferably provided in order that as soon as one ply of fabric is worn away, another ply may be exposed.

The textile fabric may preferably be of the loose weave open mesh type, the particular fabric illustrated herein being of the type commonly used to form the "breaker strip" in rubber tire construction. As illustrated, the said fabric comprises single transverse strands 5 and double longitudinal strands 6, the longitudinal strands being twisted in such manner as to hold the transverse strands therebetween. Both the transverse strands and the pairs of longitudinal strands are preferably spaced apart at distances sufficient to provide apertures 7 of substantial size in the finished fabric. Preferably the said fabric may be coated or impregnated with a rubber cement which aids in bonding the strands to the rubber during the vulcanization process.

In assembling the sole for vulcanization the central tread portion, comprising one or more layers of textile fabric and rubber of the desired shape and size, may be laid upon the body portion of the sole and the two placed in a mold for vulcanization in the usual manner, the tread portion, in this manner being pressed into the material of the body portion. Or the body portion may be died out to form an aperture 8 of a size to receive the tread portion and the tread portion may be inserted in the said aperture for vulcanization. If desired, a backing strip 9 of rubber or textile fabric may also be vulcanized to the back of the sole.

During the process of vulcanization by either of the foregoing methods, the pressure applied causes the rubber of the thin rubber plies to penetrate into all of the apertures and interstices of the textile fabric, so that in effect the thin rubber plies become a binder and filler for the closely compacted plies of fabric. The tread surface which is originally presented, therefore, is largely rubber with the strands of fabric appearing at or slightly embedded in the surface. Due to the large proportion of rubber surface presented as compared with fabric surface the sole exhibits substantially the same resistance to abrasive wear as an all rubber sole, but the presence of the fabric strands aids in preventing slipping. Furthermore, due to the fact that the strands of the fabric lie in the plane of the sole and extend both longitudinally and transversely through the sole, a substantial reinforcement is provided which aids in preventing spreading,—that is, the gradual displacement of rubber under repeated impact, and also aids in preventing cracking which results from repeated flexing.

As the sole wears down, as soon as the strands of one fabric ply wear out, or in some cases even before they are completely worn out, the strands of the next ply begin to appear, the plies of rubber being sufficiently thin that there is no substantial stratum of rubber between the plies of fabric after vulcanization.

I am aware that it has been proposed to use plies of closely woven fabric such as canvas, for example, in rubber soles, said plies lying in planes parallel to the plane of the sole, but such soles are open to the objection that the rubber fails to grip the closely woven fabric tightly and the plies tend to pull away before being worn through. In the case of open mesh fabric, however, the fabric is so embedded in the rubber, that the rubber surrounds each fabric strand on all sides and thus effectively secures each strand in the sole. Furthermore, the loose mesh fabric presents a decorative appearance which is desirable.

If desired, the tread surface of the sole may also be roughened to additionally improve its anti-slip qualities. As illustrated in the drawings, a plurality of sets of arcuate ridges 10 may be formed in the surface and, if desired, these may be supplemented by "creping" the remainder of the surface as indicated at 11. Both of these roughening operations or any other desired design may be formed by shaping the molds in the usual manner.

It will be understood that, if desired, the entire sole may be formed of alternate plies of rubber and loose mesh fabric in the same manner in which the tread portion is formed herein. It will also be understood that the invention may be variously modified and embodied within the scope of the subjoined claim.

I claim as my invention:

A rubber sole or heel having textile strands embedded therein at or near the surface thereof and lying in a plane parallel to the plane of the tread surface of the sole or heel, said strands being spaced apart a substantial distance and running both longitudinally and transversely thereof, the longitudinal strands being double and the transverse strands being single.

In testimony whereof, I have signed my name to this specification this 28th day of October, 1927.

LAURENCE M. OAKLEY.